(12) United States Patent
Wakino

(10) Patent No.: US 11,790,225 B2
(45) Date of Patent: Oct. 17, 2023

(54) DATA PROCESSING APPARATUS CONFIGURED TO EXECUTE HIERARCHICAL CALCULATION PROCESSING AND METHOD THEREOF

(71) Applicant: CANON KABUSHIKI KAISHA, Tokyo (JP)

(72) Inventor: Shiori Wakino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 705 days.

(21) Appl. No.: 16/796,442

(22) Filed: Feb. 20, 2020

(65) Prior Publication Data

US 2020/0279168 A1   Sep. 3, 2020

(30) Foreign Application Priority Data

Feb. 28, 2019   (JP) ................. 2019-036705

(51) Int. Cl.
  *G06N 3/08*   (2023.01)
(52) U.S. Cl.
  CPC ..................... *G06N 3/08* (2013.01)
(58) Field of Classification Search
  CPC .................................................. G11C 11/54
  See application file for complete search history.

(56) References Cited

U.S. PATENT DOCUMENTS

| 5,524,175 | A | 6/1996 | Sato | |
|---|---|---|---|---|
| 2010/0214936 | A1* | 8/2010 | Ito | G06V 10/955 370/252 |
| 2019/0035101 | A1* | 1/2019 | Kwant | G06V 20/588 |
| 2022/0035762 | A1* | 2/2022 | Zhang | G06F 13/4068 |

FOREIGN PATENT DOCUMENTS

| CN | 101681450 A | 3/2010 |
|---|---|---|
| JP | 2009080693 A | 4/2009 |
| JP | 2018-521374 A | 8/2018 |

OTHER PUBLICATIONS

Cui, Henggang, et al. "Geeps: Scalable deep learning on distributed gpus with a gpu-specialized parameter server." Proceedings of the eleventh european conference on computer systems. 2016. (Year: 2016).*

Yann Lecun et al.; Convolutional Networks and Applications in Vision;Proc. International Symposium on Circuits and Systems (ISCAS' 10), IEEE, 2010; pp. 253-256.

(Continued)

*Primary Examiner* — Eric Nilsson
(74) *Attorney, Agent, or Firm* — Canon U.S.A., Inc. IP Division

(57) ABSTRACT

A data processing apparatus configured to execute hierarchical calculation processing corresponding to a neural network on input data includes a storage unit configured to store a plurality of sets of control data each for use for one of a plurality of processing units into which the hierarchical calculation processing corresponding to the neural network is divided, a transfer unit configured to sequentially transfer the plurality of sets of control data from the storage unit, and a calculation processing unit configured to perform calculation processing of the processing unit corresponding to one set of control data transferred by the transfer unit using the one set of control data.

17 Claims, 12 Drawing Sheets

(56) References Cited

OTHER PUBLICATIONS

Alessandro Aimar, et al., NullHop: A Flexible Convolutional Neural Network Accelerator Based on Sparse Representations of Feature Maps, IEEE Transactions on Neural Networks and Learning Systems, Mar. 6, 2018, pp. 1-13, arXiv:1706301406v2 [cs.CV] Mar. 6, 2018, XP55604038.

Maurice Peemen, et al., Memory-Centric Accelerator Design for Convolutional Neural Networks, 2013 IEEE 31st International Conference on Computer Design (ICCD), Oct. 1, 2013, pp. 13-19, XP55572859.

Kaiyuan Guo, et al., RRAM Based Buffer Design for Energy Efficient CNN Accelerator, 2018 IEEE Computer Socierty Annual Symposium on VLSI, IEEE, Jul. 8, 2018, pp. 435-440, XP33382428.

* cited by examiner

FIG.3

| Address | | |
|---|---|---|
| 0x0 | FINAL LAYER DESIGNATION | |
| 0x4 | NUMBER OF REFERENCE FEATURE SURFACES | |
| 0x8 | NON-LINEAR CONVERSION | |
| 0xc | CALCULATION RESULT STORAGE DESTINATION POINTER | |
| 0x10 | HORIZONTAL FILTER KERNEL SIZE | |
| 0x14 | VERTICAL FILTER KERNEL SIZE | |
| 0x18 | WEIGHT COEFFICIENT STORAGE DESTINATION POINTER | |
| 0x1c | HORIZONTAL REFERENCE FEATURE SURFACE SIZE | |
| 0x20 | VERTICAL REFERENCE FEATURE SURFACE SIZE | |
| 0x24 | REFERENCE FEATURE SURFACE STORAGE DESTINATION POINTER | |
| | STORAGE DESTINATION POINTER | |
| | STORAGE DESTINATION POINTER | |
| | STORAGE DESTINATION POINTER | |

903a, 903b, 903c, 903d

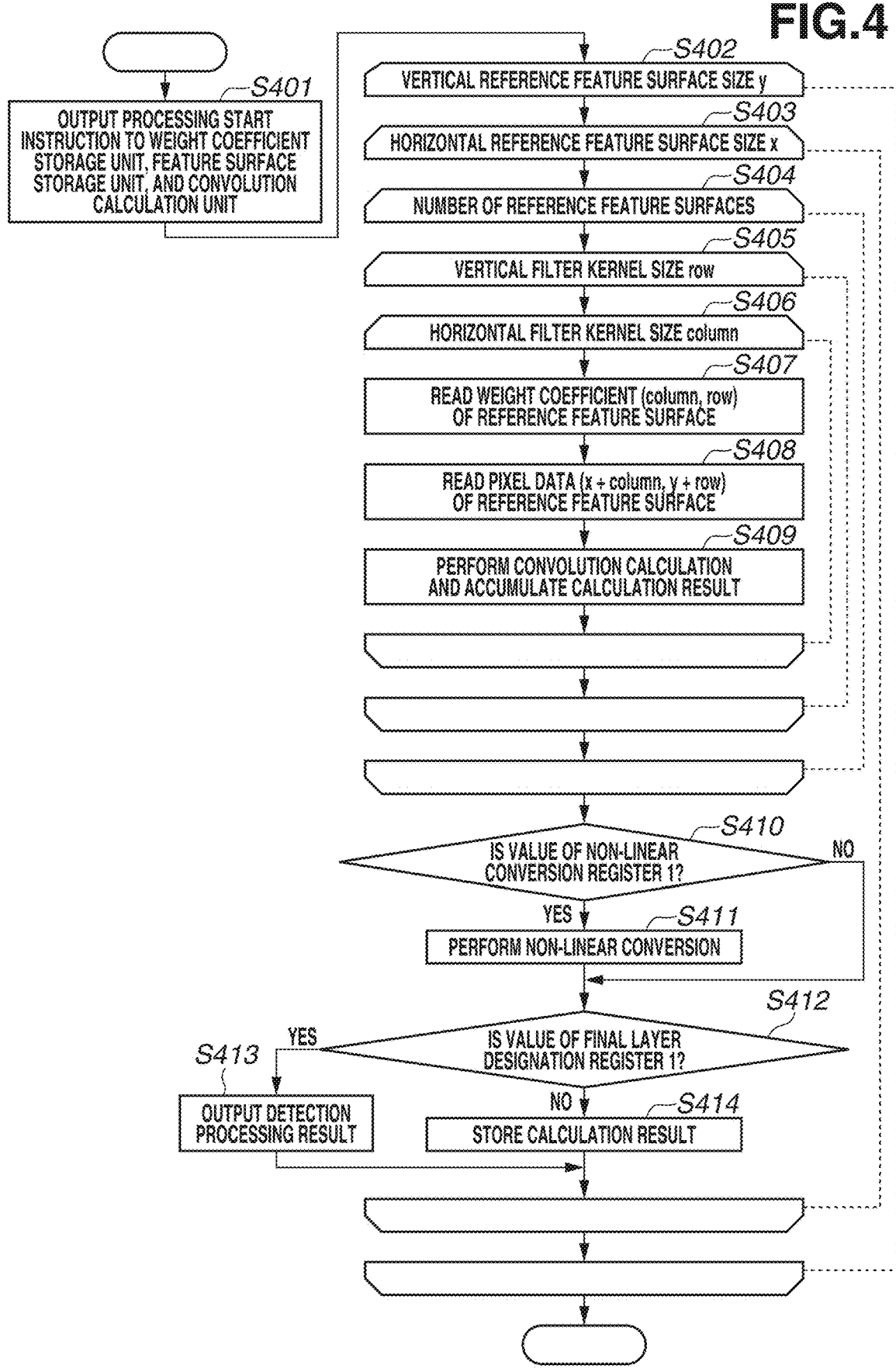

|  | NUMBER OF REFERENCE FEATURE SURFACES | KERNEL FILTER SIZE | NUMBER OF GENERATED FEATURE SURFACES | WEIGHT COEFFICIENT (byte) | FEATURE SURFACE MEMORY (byte) | PROCESSING NUMBER |
|---|---|---|---|---|---|---|
| FIRST HIERARCHY | 1 | 3 × 3 | 4 | 36 | 5120 | 1 |
| SECOND HIERARCHY | 4 | 5 × 5 | 4 | 400 | 8192 | 2 |
| THIRD HIERARCHY | 4 | 7 × 7 | 1 | 196 | 5120 | 3 |

702

|  | NUMBER OF REFERENCE FEATURE SURFACES | KERNEL FILTER SIZE | NUMBER OF GENERATED FEATURE SURFACES | WEIGHT COEFFICIENT (byte) | FEATURE SURFACE MEMORY (byte) | PROCESSING NUMBER |
|---|---|---|---|---|---|---|
| FIRST HIERARCHY | 1 | 3 × 3 | 4 | 36 | 5120 | 1 |
| SECOND HIERARCHY | 4 | 5 × 5 | 8 | 800 | 12288 | 2 |
| THIRD HIERARCHY | 4 | 7 × 7 | 1 | 196 | 5120 | 3 |

703

|  | NUMBER OF REFERENCE FEATURE SURFACES | KERNEL FILTER SIZE | NUMBER OF GENERATED FEATURE SURFACES | WEIGHT COEFFICIENT (byte) | FEATURE SURFACE MEMORY (byte) | PROCESSING NUMBER |
|---|---|---|---|---|---|---|
| FIRST HIERARCHY | 1 | 3 × 3 | 4 | 36 | 5120 | 1 |
| SECOND HIERARCHY | 4 | 5 × 5 | 4 | 400 | 12288 | 2 |
| SECOND HIERARCHY | 4 | 5 × 5 | 4 | 400 | 12288 | 3 |
| THIRD HIERARCHY | 4 | 7 × 7 | 1 | 196 | 5120 | 4 |

704

|  | NUMBER OF REFERENCE FEATURE SURFACES | KERNEL FILTER SIZE | NUMBER OF GENERATED FEATURE SURFACES | WEIGHT COEFFICIENT (byte) | FEATURE SURFACE MEMORY (byte) | PROCESSING NUMBER |
|---|---|---|---|---|---|---|
| FIRST HIERARCHY #BLK0 | 1 | 3 × 3 | 4 | 36 | 2560 | 1 |
| SECOND HIERARCHY #BLK0 | 4 | 5 × 5 | 8 | 800 | 6144 | 2 |
| THIRD HIERARCHY #BLK0 | 4 | 7 × 7 | 1 | 196 | 2560 | 3 |
| FIRST HIERARCHY #BLK1 | 1 | 3 × 3 | 4 | 36 | 2560 | 4 |
| SECOND HIERARCHY #BLK1 | 4 | 5 × 5 | 8 | 800 | 6144 | 5 |
| THIRD HIERARCHY #BLK1 | 4 | 7 × 7 | 1 | 196 | 2560 | 6 |

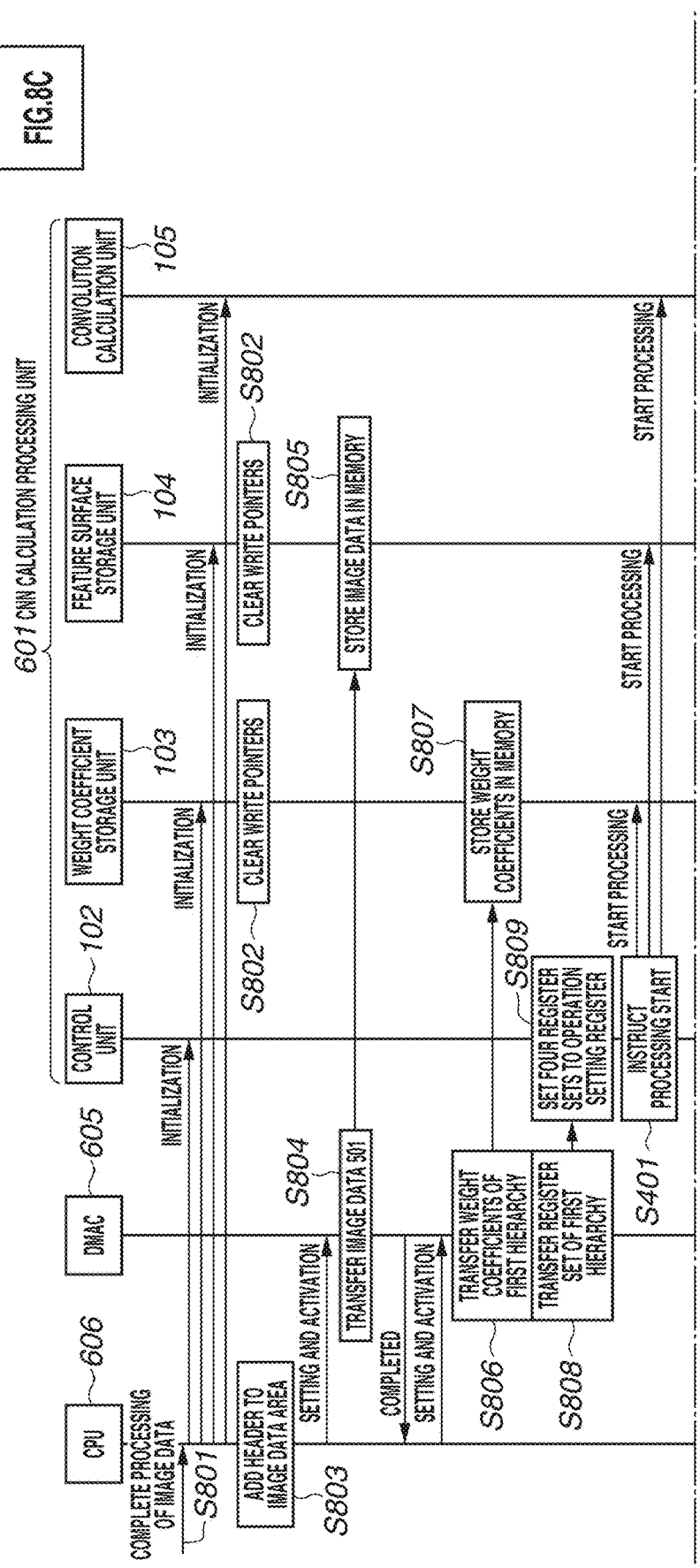

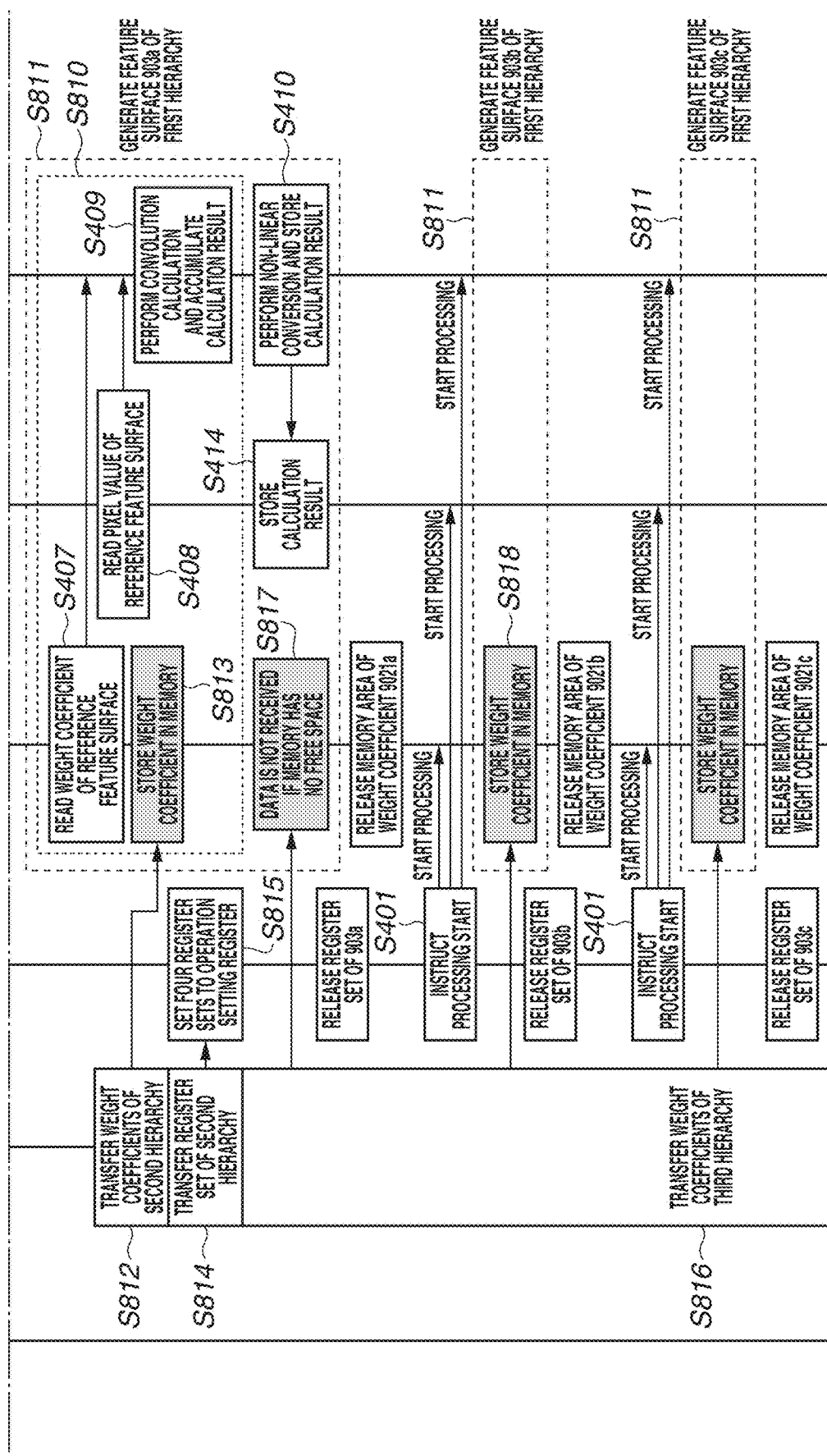

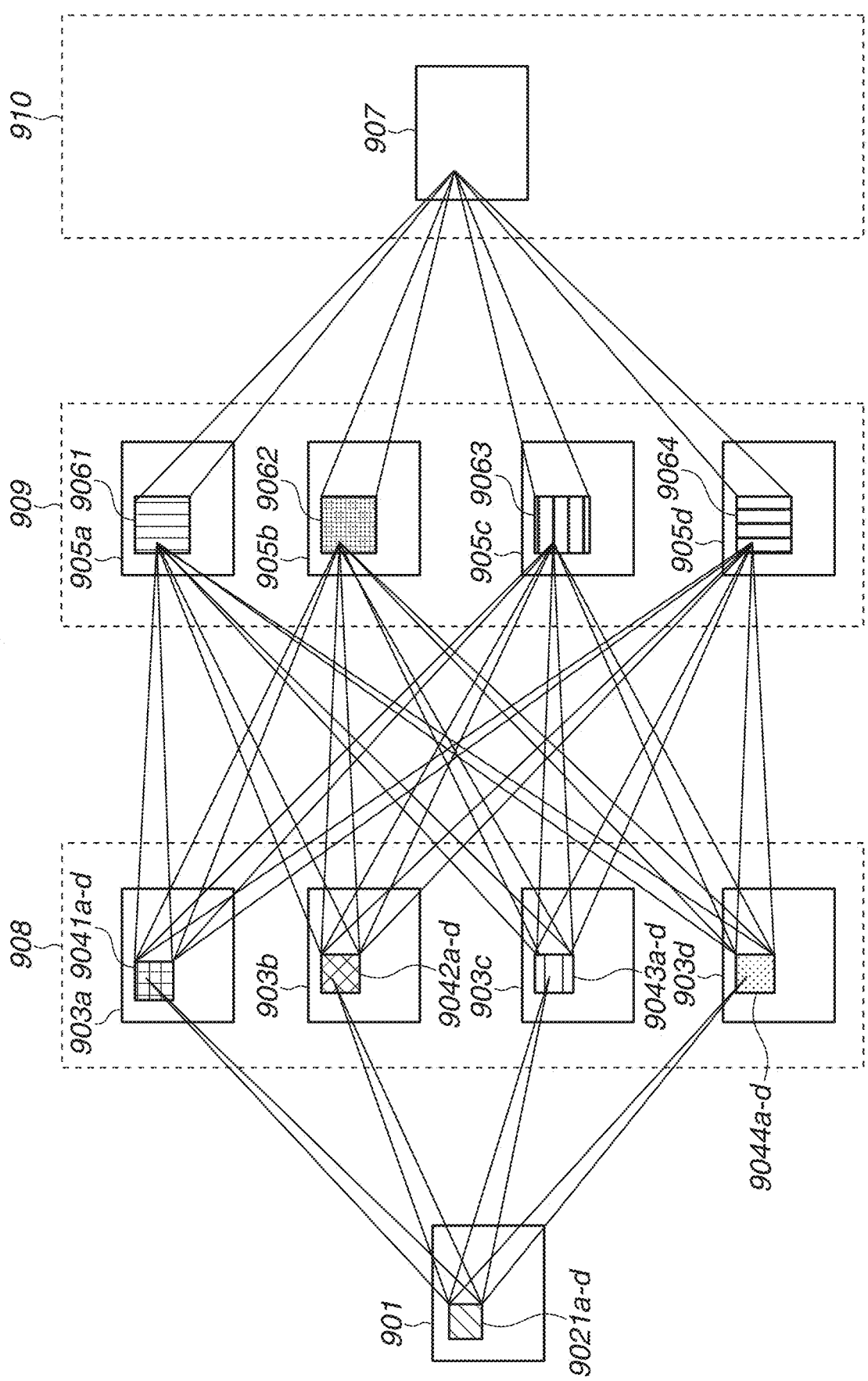

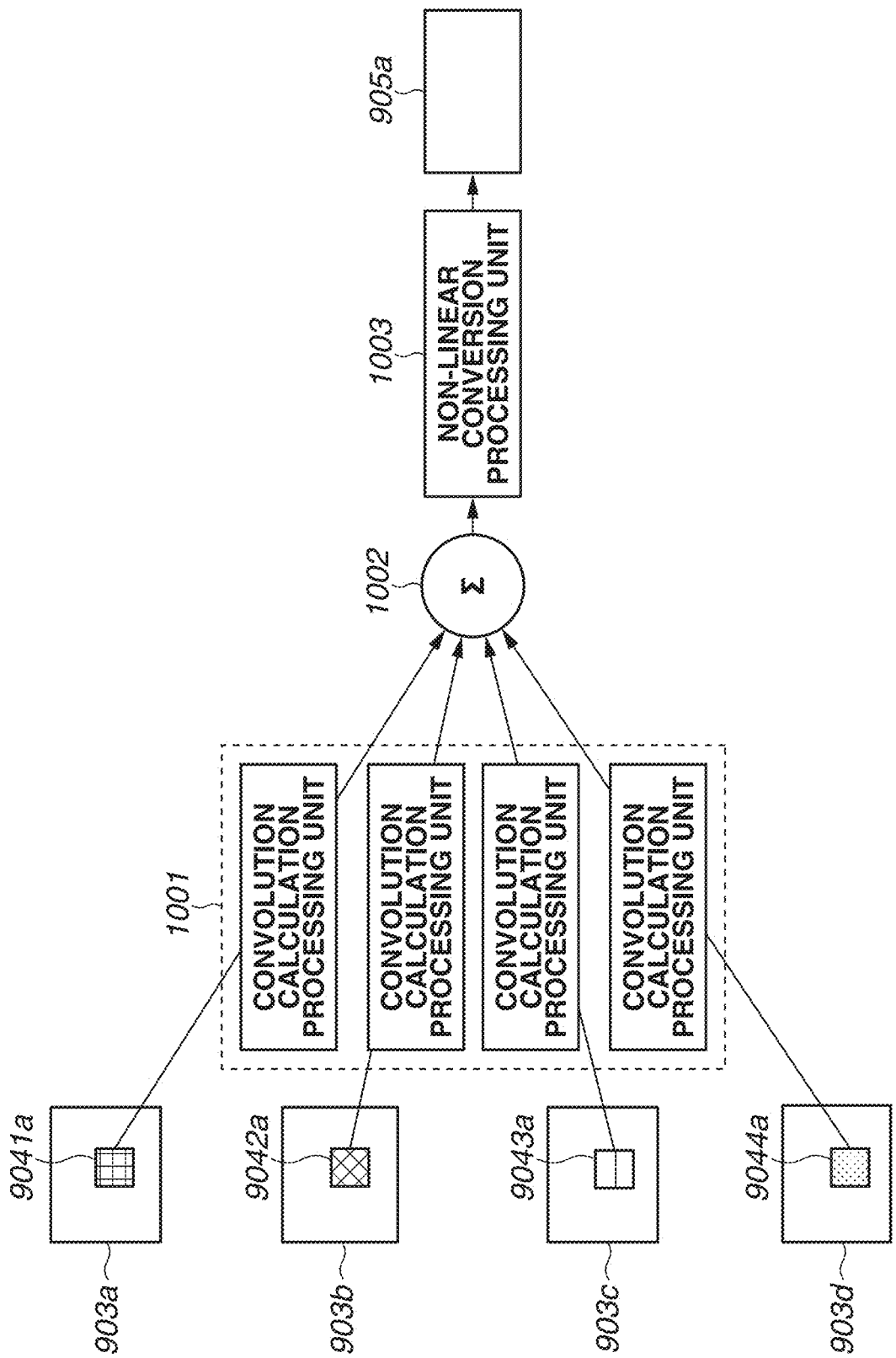

DATA PROCESSING APPARATUS CONFIGURED TO EXECUTE HIERARCHICAL CALCULATION PROCESSING AND METHOD THEREOF

BACKGROUND OF THE INVENTION

Field of the Invention

The present invention relates to a data processing apparatus configured to execute hierarchical calculation processing corresponding to a neural network and a method thereof.

Description of the Related Art

A hierarchical calculation method such as convolutional neural networks (hereinafter, abbreviated as CNN) have drawn attention as a method that enables robust pattern recognition with respect to a change in a recognition target. For example, Yann LeCun, Koray Kavukvuoglu, and Clement Farabet, "Convolutional Networks and Applications in Vision," Proc. International Symposium on Circuits and Systems (ISCAS' 10), IEEE, 2010. discusses various application examples and implementation examples.

FIG. 9 is a network configuration diagram illustrating an example of a simple CNN. In a case where CNN processing is to be performed on image data, an input layer 901 inputs the image data of predetermined size. A first hierarchy 908 includes feature surfaces 903a to 903d. A second hierarchy 909 includes feature surfaces 905a to 905d. A third hierarchy 910 includes a feature surface 907.

The term "feature surface" refers to a data surface that corresponds to a result of a predetermined feature extraction calculation (convolution calculation and non-linear processing) processing. A feature surface corresponds to a result of feature extraction for recognizing a predetermined target in a higher hierarchy and is a result of processing on image data, so that a processing result is also expressed as a surface. The feature surfaces 903a to 903d are generated by convolution calculation and non-linear processing on the input layer 901. For example, the feature surface 903a is calculated by a calculation using a two-dimensional convolution kernel (weight coefficient) 9021a, which is schematically illustrated, and a non-linear conversion of the calculation result.

For example, a two-dimensional convolution calculation using a kernel (coefficient matrix) having a size that is columnSize×rowSize is processed by a multiply-accumulate operation expressed by Formula (1):

$$\text{output}(x, y) = \sum_{row=-rowSize'/2}^{rowSize'/2} \sum_{column=-columnSize'/2}^{columnSize'/2} \text{input}(x+column, y+row) \times \text{weight}(column, row), \quad (1)$$

where input (x, y) represents a reference pixel value at coordinates (x, y), output (x, y) represents a calculation result at coordinates (x, y), weight (column, row) represents a weight coefficient used in the operation of the output (x, y), and columnSize and rowSize represent the convolution kernel size.

In CNN processing, the multiply-accumulate operation is repeated while a plurality of convolution kernels is used to scan image data in pixel units, and a final multiply-accumulate operation result is non-linearly converted to thereby calculate a feature surface. In the case of calculating the feature surface 903a, since the number of connections with a previous hierarchy is one, the number of convolution kernels is one. Convolution kernels 9021b, 9021c, and 9021d are used in calculating the feature surfaces 903b, 903c, and 903d, respectively.

FIG. 10 illustrates an example of a case of calculating the feature surface 905a. The feature surface 905a is connected with the four feature surfaces 903a to 903d of the previous hierarchy 908. In a case of calculating data of the feature surface 905a, a filter operation is performed on the feature surface 903a using a kernel (weight coefficient) 9041a, which is schematically illustrated, and a filter operation result is stored in an accumulation adder 1002.

Similarly, a convolution calculation processing unit 1001 performs a convolution calculation on the feature surfaces 903b, 903c, and 904c using kernels 9042a, 9043a, and 9044a, respectively, and a convolution calculation result is stored in the accumulation adder 1002. After four types of convolution calculation are finished, a non-linear conversion processing unit 1003 performs non-linear conversion processing using a logistic function or a hyperbolic tangent function (tan h function).

The above-described processing is performed on the entire image while scanning pixel by pixel to thereby calculate the feature surface 905a. Similarly, the feature surface 905b is calculated by performing a convolution calculation on the feature surfaces 903a to 903d of the previous hierarchy 908 using four convolution kernels 9041b, 9042b, 9043b, and 9044b. Further, the feature surface 907 is calculated by performing a convolution calculation on the feature surfaces 905a to 905d of the previous hierarchy 909 using four convolution kernels 9061, 9062, 9063, and 9064. Each kernel coefficient is predetermined by learning using a generally-used method, such as perceptron learning or back propagation learning.

In a recent large-scale network called deep network, the number of data surfaces to be referenced in generating one feature surface is increased, i.e., the number of connections is increased. Consequently, the number of weight coefficients necessary for calculation is increased. Further, the number of hierarchies is increased, and the operation parameter size of each hierarchy is also increased in order to increase recognition accuracy.

In a case where CNN processing hardware configured to perform CNN calculation is implemented in an embedded system and network processing is performed, the CNN processing hardware performs calculation of input data and a weight coefficient for each hierarchy. Then, the calculation result is used as input data of the next hierarchy, and calculation of the input data and a weight coefficient of the next hierarchy is performed. This is repeated to thereby obtain a final pattern recognition result.

For example, Japanese Unexamined Patent Application Publication (Translation of PCT Application) No. 2018-521374 discusses a method in which a weight coefficient of each hierarchy that is necessary for CNN processing and information about each hierarchy are transferred to an internal memory, and calculation is performed while the weight coefficient and the information are efficiently transferred from the internal memory to a calculation unit.

In the case where the CNN processing hardware is implemented in the embedded system, from the point of view of cost, it is undesirable to store all the weight coefficients and operation parameters necessary for processing all the hierarchies in an internal large-capacity memory and use the stored weight coefficients and the operation parameters in calculation. Thus, the weight coefficients and the operation parameters of all the hierarchies are stored in an inexpensive external memory, such as a read-only memory (ROM) or a dynamic random access memory (DRAM), and only the weight coefficients and the operation parameters used in processing of one hierarchy are stored in the internal memory and an internal register and used.

At this time, the processing of each hierarchy is started after the weight coefficients and the operation parameters, which are large in data amount, are transferred from the external memory to the CNN processing hardware. In the embedded system, in general, an external memory and an internal bus also share and use a functional block other than the CNN processing hardware, so that memory latency from when the CNN processing hardware makes a data read request to when read data arrives increases. Thus, it takes time to prepare for processing at the time of switching the hierarchy.

Meanwhile, there are demands for processing various neural networks at high speed, so that a high-speed, flexible processing control is needed. In a case where a control processor that controls the CNN processing hardware performs processing control based on the neural network, if a processing target neural network is changed, firmware also needs to be changed. This increases development cost of the firmware.

SUMMARY OF THE INVENTION

According to an aspect of the present invention, a data processing apparatus configured to execute hierarchical calculation processing corresponding to a neural network on input data includes a storage unit configured to store a plurality of sets of control data each for use for one of a plurality of processing units into which the hierarchical calculation processing corresponding to the neural network is divided, a transfer unit configured to sequentially transfer the plurality of sets of control data from the storage unit, and a calculation processing unit configured to perform calculation processing of the processing unit corresponding to one set of control data transferred by the transfer unit using the one set of control data.

Further features of the present invention will become apparent from the following description of exemplary embodiments with reference to the attached drawings.

BRIEF DESCRIPTION OF THE DRAWINGS

FIG. 3 is a diagram illustrating operation setting registers.

FIG. 4 is a flowchart illustrating a process of generating a feature surface by the CNN calculation processing unit.

FIG. 7 is a diagram illustrating an amount of memory necessary for processing a network and a processing unit.

FIG. 8 includes FIGS. 8A, 8B, and 8C are sequence diagrams illustrating an image processing system.

FIG. 9 is a diagram illustrating a network configuration of an example of CNN.

FIG. 10 is a diagram illustrating an example of a case of calculating a feature surface.

DESCRIPTION OF THE EMBODIMENTS

An exemplary embodiment of the present invention will be described below with reference to the drawings.

A first exemplary embodiment of the present invention will be described below with reference to FIGS. 1 to 8.

Figure 6:
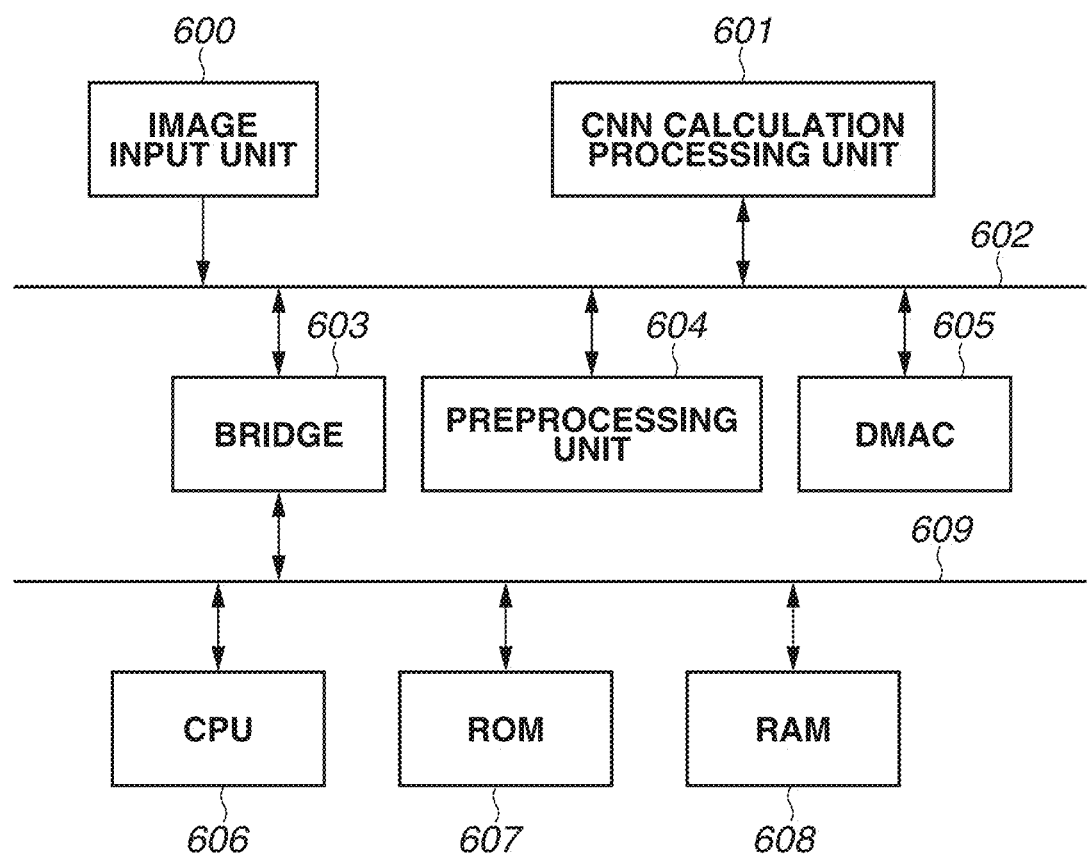
FIG. 6 is a block diagram illustrating an example of a configuration of an image processing system that uses a pattern recognition apparatus.

FIG. 6 illustrates an example of a configuration of an image processing system that uses a pattern recognition apparatus according to the present exemplary embodiment. The system has a function of detecting an area of a specific object from image data. In FIG. 6, an image input unit 600 includes an optical system and a photoelectric conversion device such as a charge-coupled device (CCD) sensor or a complementary metal oxide semiconductor (CMOS) sensor. The image input unit 600 further includes a driver circuit that controls the sensor, an analog-digital converter, a signal processing circuit that performs various types of image correction, and a frame buffer.

A convolutional neural network (CNN) calculation processing unit 601 includes a calculation apparatus according to the present exemplary embodiment. A direct memory access controller (DMAC) 605 is a data transfer unit that performs data transfer between a processing unit on an image bus 602 and a central processing unit (CPU) bus 609. A bridge 603 provides a bridge function to bridge the image bus 602 and the CPU bus 609. A preprocessing unit 604 performs various types of preprocessing for effective execution of pattern recognition processing. More specifically, the preprocessing unit 604 performs image data conversion processing such as color conversion processing and contrast correction processing by hardware. A CPU 606 controls operation of the entire image processing system.

A read-only memory (ROM) 607 is a data storage unit configured to store a command and operation parameter data that specify operation of the CPU 606 and a control data set for causing the CNN calculation processing unit 601 to operate. The control data set (hereinafter, also referred to simply as data set) includes a weight coefficient and an operation parameter for a neural network to be processed. The data set is input to a pattern recognition processing unit via the DMAC 605. A random access memory (RAM) 608 is used in operation of the CPU 606.

Image data input from the image input unit 600 is processed by the preprocessing unit 604, and the processed image data is temporarily stored on the RAM 608. Then, the stored image data is input from the RAM 608 to the CNN calculation processing unit 601 via the DMAC 605. Based on the data set, the CNN calculation processing unit 601 performs predetermined determination processing in pixel units of the input preprocessed image data, and determines an area of a predetermined object in the input image. A result of the determination is stored in the RAM 608 via the DMAC 605.

Figure 1:
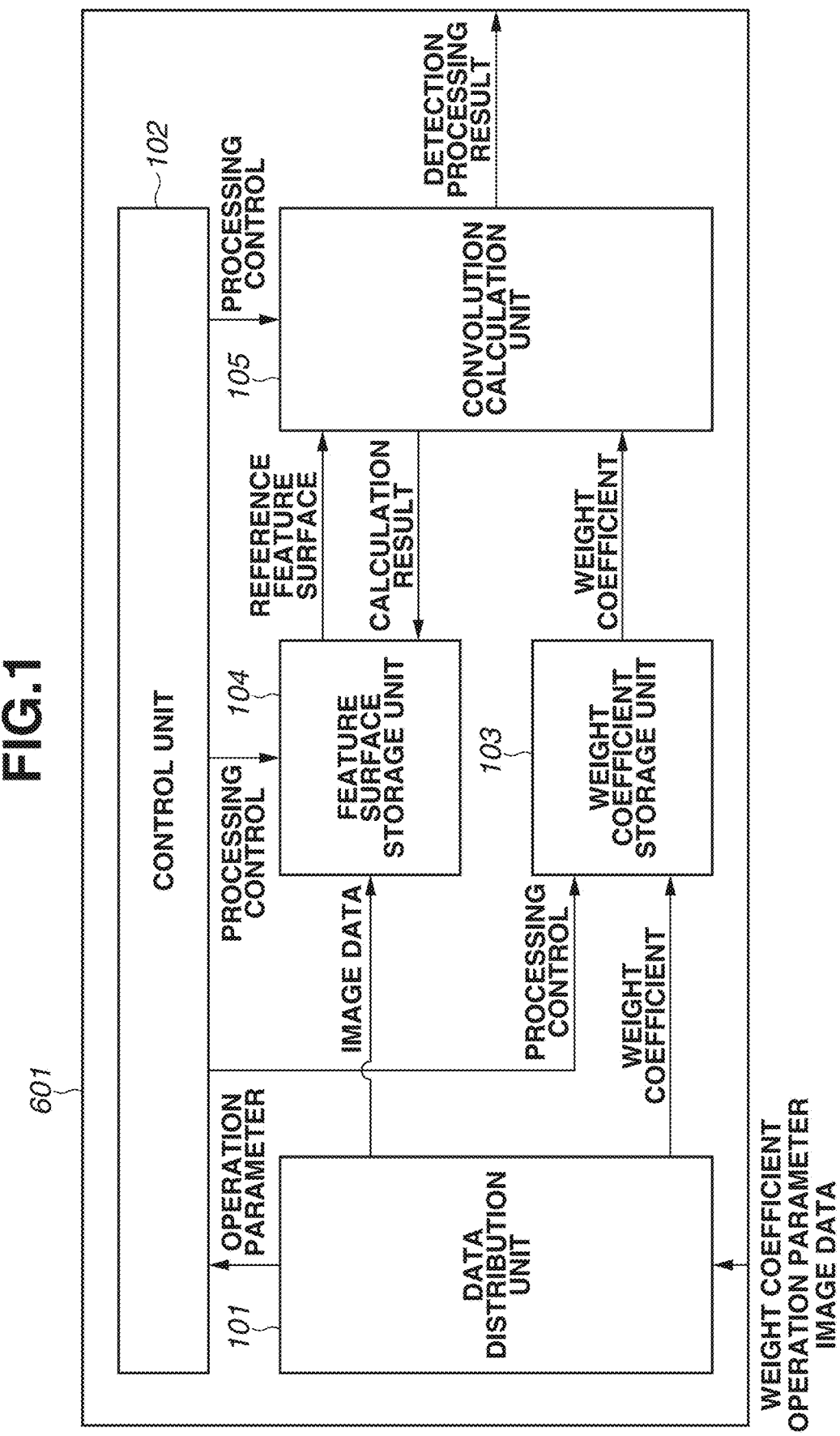
FIG. 1 is a block diagram illustrating a convolutional neural network (CNN) calculation processing unit according to an exemplary embodiment.

FIG. 1 is a block diagram illustrating the CNN calculation processing unit 601. A function of each block will be described below. A data distribution unit 101 receives data transmitted from the DMAC 605, refers to a destination indicator and a transfer length that are added to a header of the data, and transmits the data to a corresponding internal block. The data transmission and reception is performed using a standard two-line handshake protocol (Valid/Ready).

Figure 2:
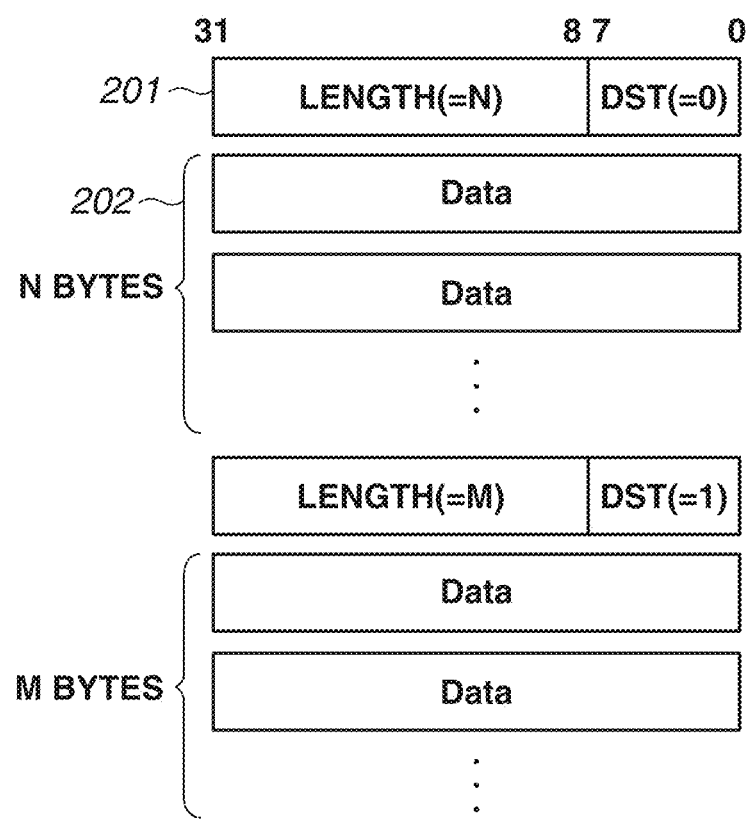
FIG. 2 is a diagram illustrating a data format received by a data distribution unit.

FIG. 2 illustrates a data format that is received by the data distribution unit 101, and operation of the data distribution unit 101 will be described below. An incoming data width is 32 bits. The data contains a header 201 and a data body 202. A DST field of the lower eight bits of the header 201 specifies a destination, whereas a LENGTH field of the upper 24 bits specifies a transfer length (the number of bytes) of the data body 202. A unique identifier (ID) is added in advance to each internal block, and the data body 202 corresponding to the LENGTH is transmitted to the block of the ID that matches the value of the DST field. For example, in a case where the data illustrated in FIG. 2 is received, the header 201 of the first data contains DST=0 and LENGTH=N, so that the data body 202 of N bytes is transmitted to the internal block of the ID that is 0. The header 201 of the next data contains DST=1 and LENGTH=M, so that the data body 202 of M bytes is transmitted to the internal block of the ID that is 1. The ID that specifies a destination can be an address.

A control unit 102 controls the entire CNN calculation processing unit 601 and includes operation setting registers. The operation setting registers include a plurality of operation setting register sets, and information for generating one feature surface is stored in each of the operation setting register sets. The operation setting registers of the control unit 102 include eight operation setting register sets. A value to be set is stored as an operation parameter in the ROM 607. The control unit 102 receives the value via the DMAC 605 and the data distribution unit 101 and sets the received value to the internal operation setting register set. The ID of the control unit 102 is 0.

The set register value is distributed as a processing control signal to a weight coefficient storage unit 103, a feature surface storage unit 104, and a convolution calculation unit 105. The processing control signal contains a processing start instruction signal in addition to the register value, and an instruction to start processing is issued when one or more operation setting register sets are set.

FIG. 3 illustrates operation setting register sets. A "final layer designation" register is a register that designates whether a feature surface to be generated by the operation setting register set is a final layer. In a case where the final layer designation register is 1, a detection processing result is externally output when the processing of generating the feature surface is ended. A "number of reference feature surfaces" register is a register that designates the number of feature surfaces of a previous hierarchy that are to be connected with the generated feature surface. For example, in a case where feature surfaces 905a to 905d in FIG. 9 are calculated, 4 is set. A "non-linear conversion" register is a register that designates whether to perform non-linear conversion. In a case where 1 is set, non-linear conversion processing is performed, whereas in a case where 0 is set, non-linear conversion processing is not performed.

A "calculation result storage destination pointer" register is a register that designates an address that specifies a head pointer of the feature surface storage unit 104, which stores a calculation result of a generated feature surface as described below. The calculation result is stored in the order of raster scan using a value of the pointer as the head pointer. A "horizontal filter kernel size" register and a "vertical filter kernel size" register are registers that designate the size of a filter kernel to be used in calculation of the generated feature surface.

A "weight coefficient storage destination pointer" register is a register that specifies a storage destination address of the weight coefficient storage unit 103 as a storage destination of a weight coefficient to be used in calculation of the generated feature surface. For example, weight coefficient data contains the same number of combinations of coefficients as the "number of reference feature surfaces" register, and weight coefficients are stored in the order of raster scan from the address designated by the "weight coefficient storage destination pointer" register. More specifically, the number of combinations of coefficient data stored in the weight coefficient storage unit 103 is the same as "horizontal filter kernel size"×"vertical filter kernel size"×"number of reference feature surfaces".

A "horizontal reference feature surface size" register and a "vertical reference feature surface size" register are registers that respectively specify the number of horizontal pixels of the reference feature surface and the number of vertical lines of the reference feature surface. A "reference feature surface storage destination pointer" register is a register that designates the address that specifies the head pointer of the feature surface storage unit 104, which stores the reference feature surfaces. The reference feature surfaces are stored in the order of raster scan using a value of the pointer as the head pointer. More specifically, the number of pieces of feature surface data stored in the feature surface storage unit 104 is the same as "horizontal reference feature surface size"×"vertical reference feature surface size"× "number of reference feature surfaces".

The plurality of registers described above is provided in feature surface units. In a case where the content of the "reference feature surface storage destination pointer" register of the generated feature surface is the "calculation result storage destination pointer" of a feature surface of a previous hierarchy that is to be connected, the feature surface of the previous hierarchy and the generated feature surface are connected. Thus, with the register setting alone, a desired hierarchical connection relationship can be configured in feature surface units. Each operation parameter in the ROM 607 has a data configuration containing a series of the above-described register sets corresponding to the number of generated feature surfaces. The control unit 102 sequentially sets the operation parameter to eight operation setting register sets. When the control unit 102 sets the operation parameter to all the eight sets, a two-line handshake signal Ready is negated, and subsequent operation parameter data is not received. If the processing on a previously-set operation setting register set is completed, the processed operation setting register set is released, and next operation parameter data is received and the setting is performed.

The weight coefficient storage unit 103 includes a memory configured to store weight coefficient data and a memory control unit. The weight coefficient storage unit 103 includes a read pointer and a write pointer. The read pointer specifies a read address of the memory, and the write pointer specifies a write address. The memory is used as a ring buffer. In a case of a normal ring buffer, a free space in the memory is managed by the write pointer and the read pointer, but according to a flowchart in FIG. 4 described below, the same weight coefficient is read a plurality of times and used. When the last reading is finished, a memory area of the weight coefficient is released, and the free space of the memory is managed based on a difference from the write pointer. In a case where there is no free space in the memory, a two-line handshake signal Ready is negated, and data is not received. The ID of the weight coefficient storage unit 103 is 1.

If the weight coefficient storage unit 103 receives a processing start instruction from the control unit 102, the weight coefficient storage unit 103 refers to the values of the "weight coefficient storage destination pointer", "horizontal filter kernel size", "vertical filter kernel size", and the "number of reference feature surfaces" registers. The weight coefficient storage unit 103 updates the read pointer with the value of the "weight coefficient storage destination pointer" register, reads the weight coefficient of "horizontal filter kernel size"דvertical filter kernel size"דnumber of reference feature surfaces", and transmits the read weight coefficient to the convolution calculation unit 105 described below. Further, the write pointer is updated with the head address of the memory at the time of initialization. If the weight coefficient storage unit 103 receives the weight coefficient from the data distribution unit 101, the weight coefficient storage unit 103 stores the data to the address specified by the write pointer and increments the write pointer. If the write pointer reaches the final address of the memory, the write pointer is returned to the head address of the memory.

The feature surface storage unit 104 stores feature surface data and includes a memory and a memory control unit. The feature surface storage unit 104 includes a read pointer and a write pointer. The read pointer specifies a read address of the memory, and the write pointer specifies a write address. The ID of the feature surface storage unit 104 is 2.

The feature surface storage unit 104 receives a processing start instruction from the control unit 102. Then, the feature surface storage unit 104 refers to the values of the "reference feature surface storage destination pointer", "horizontal reference feature surface size", "vertical reference feature surface size", "number of reference feature surfaces", "horizontal filter kernel size", and "vertical filter kernel size" registers. Then, the feature surface storage unit 104 reads the reference pixel value expressed by Formula (1) and transmits the read reference pixel value to the convolution calculation unit 105 described below. More specifically, the feature surface storage unit 104 updates the read pointer with the value of the "reference feature surface storage destination pointer" register. The feature surface storage unit 104 determines the first reference feature surface coordinates (0, 0) based on the "horizontal filter kernel size" (=columnSize) and the "vertical filter kernel size" (=rowSize). Then, the feature surface storage unit 104 reads reference pixel values (−columnSize/2, −rowSize/2) to (columnSize/2, rowSize/2) at the determined coordinates and transmits the read values. Next, the reference pixel value at the second reference feature surface coordinates (0, 0), the reference pixel value at the third reference feature surface coordinates (0, 0), etc., and the reference pixel value at the $n^{th}$ reference feature surface coordinates (0, 0) are read in this order, where n is the "number of reference feature surfaces", and the read reference pixel values are transmitted. Then, each reference feature surface is horizontally shifted by one pixel, and an equal number of the reference pixel values ((1−columnSize)/2, −rowSize/2) to ((1+columnSize)/2, rowSize/2) at the reference feature surface coordinates (1, 0) to the "number of reference feature surfaces" are similarly transmitted. In this way, the reference feature surfaces shifted horizontally by the "horizontal reference feature surface size" are transmitted. Next, the reference pixel values (−columnSize/2, (1−rowSize)/2) to (columnSize/2, (1+rowSize)/2) at the reference feature surface coordinates (0, 1) shifted vertically by one line are similarly transmitted. After the reference feature surfaces shifted by the "vertical reference feature surface size" in a line direction are transmitted, the processing is completed.

If the feature surface storage unit 104 receives a processing start instruction from the control unit 102, the feature surface storage unit 104 reads the reference feature surfaces and transmits the read reference feature surfaces while receiving a generated feature surface that is a calculation result from the convolution calculation unit 105 described below and writes the received generated feature surface to the memory. This processing refers to the values of the "final layer designation", "calculation result storage destination pointer", "horizontal reference feature surface size", and "vertical reference feature surface size" registers. More specifically, the write pointer is updated with the value of the "calculation result storage destination pointer" register. In a case where the value of the "final layer designation" register is 0, a generated feature surface is received, and the data is stored in the address of the write pointer. The write pointer is incremented. After a calculation result of "horizontal reference feature surface size"דvertical reference feature surface size" is received, the processing is completed. In a case where the value of the "final layer designation" register is 1, no generated feature surface is received.

The write pointer is updated with the head address of the memory at the time of initialization. If image data is received from the data distribution unit 101, the data is stored at the address specified by the write pointer, and the write pointer is incremented. Image data is received only during input layer processing.

If the convolution calculation unit 105 receives a processing start instruction from the control unit 102, the convolution calculation unit 105 receives the weight coefficient and data from the weight coefficient storage unit 103 and the feature surface storage unit 104 and performs convolution calculation. If the convolution calculation unit 105 receives the weight coefficient of "horizontal filter kernel size"× "vertical filter kernel size" and the reference pixel values, the convolution calculation unit 105 performs convolution calculation. The convolution calculation unit 105 stores the calculation result in an internal accumulation adder and accumulates the calculation result. In a case where the value of the "non-linear conversion" register is 1, the convolution calculation unit 105 performs non-linear conversion processing on a result of accumulation addition of an equal number of calculation results to the "number of reference feature surfaces" and transmits the calculation result to the feature surface storage unit 104. In a case where the value of the "non-linear conversion" register is 0, the non-linear conversion processing is not performed, and the calculation result is transmitted to the feature surface storage unit 104. Further, in a case where the value of the "final layer designation" register is 1, the calculation result is externally transmitted and stored in the RAM 608 via the DMAC 605.

FIG. 4 is a flowchart illustrating a process of generating a feature surface by the CNN calculation processing unit 601. The CNN calculation processing unit 601 starts the process illustrated in the flowchart in FIG. 4 if one or more register sets are set among the operation setting registers of the control unit 102. In step S401, the control unit 102 issues a processing start instruction to the weight coefficient storage unit 103, the feature surface storage unit 104, and the convolution calculation unit 105. Step S402 is a "vertical reference feature surface size" loop, which is the outermost loop Step S403 is a "horizontal reference feature surface size" loop. More specifically, the reference feature surfaces are scanned in raster order, and feature surfaces are generated in the raster order.

Next, step S404 is a "number of reference feature surfaces" loop, step S405 is a "vertical filter kernel size" loop, and step S406 is a "horizontal filter kernel size" loop. More specifically, the reference pixel values in a reference pixel range are processed in the raster order for each reference feature surface. Step S407 is the step of reading the weight coefficient of each reference feature surface by the weight coefficient storage unit 103, and the coordinates of the weight coefficient to be read are determined based on loop variables of steps S404 and S405. Step S408 is the step of reading the pixel value of each reference feature surface by the feature surface storage unit 104, and the coordinates of the pixel value to be read are determined based on loop variables of steps S402, S403, S405, and S406.

In step S409, the convolution calculation unit 105 performs convolution calculation on the pixel value and the weight coefficient that are read in steps S407 and S408, and the convolution calculation result is accumulated. If the loop of step S404 is ended, then in step S410, the convolution calculation unit 105 refers to the "non-linear conversion" register. In a case where the register value is 1 (YES in step S410), the processing proceeds to step S411, and the non-linear conversion processing is performed. In a case where the register value is 0 (NO in step S410), step S411 is skipped. In step S412, the convolution calculation unit 105 refers to the "final layer designation" register. In a case where the register value is 1 (YES in step S412), the processing proceeds to step S413, and the detection processing result is externally transmitted. In a case where the register value is 0 (NO in step S412), the processing proceeds to step S414, and the calculation result is transmitted to the feature surface storage unit 104. The feature surface storage unit 104 stores the calculation result based on the write pointer.

If the processing of generating one feature surface is completed, the process illustrated in the flowchart is completed. The memory area storing the processed weight coefficient and the register set are released.

Figure 5:
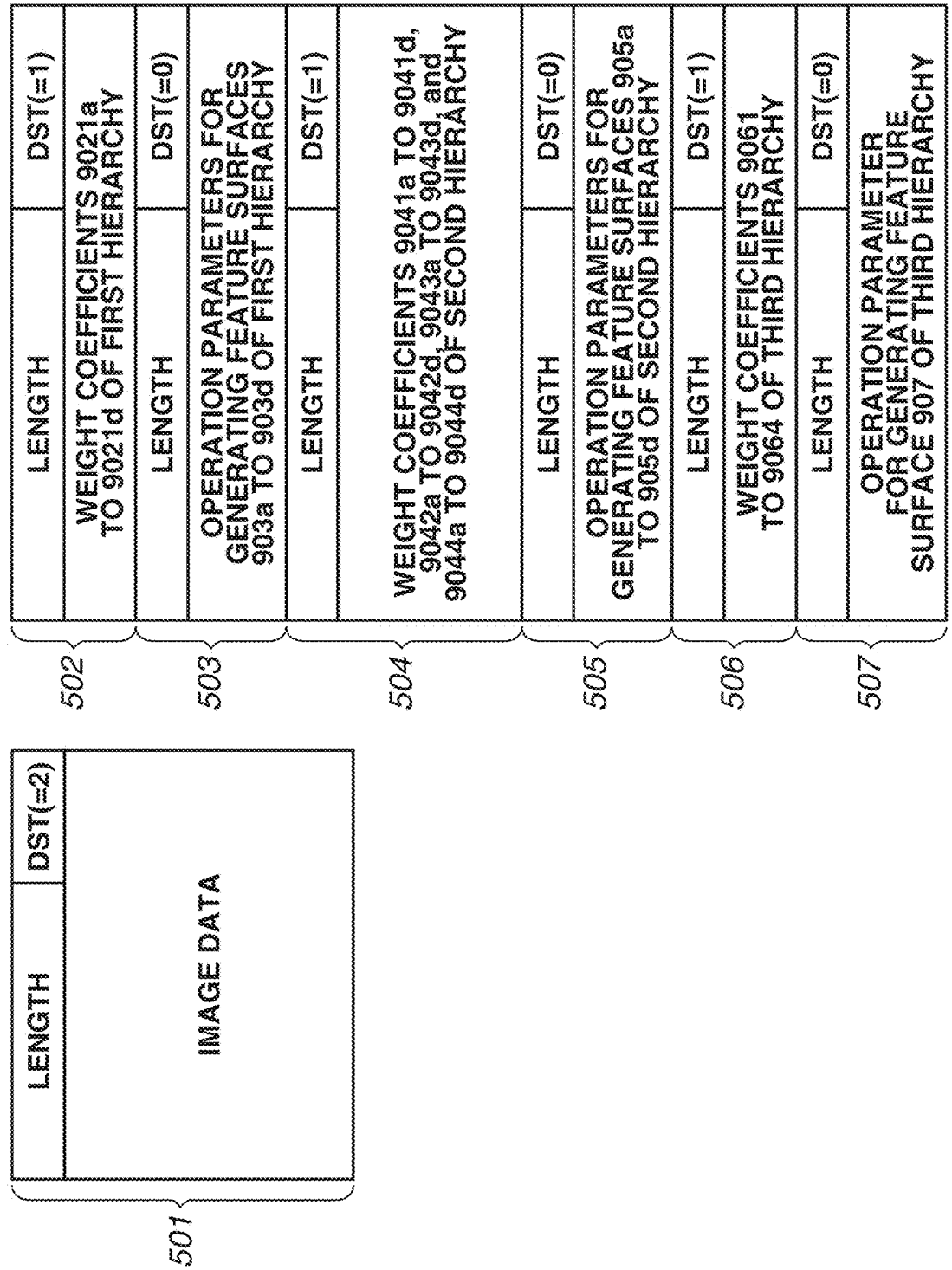
FIG. 5 is a diagram illustrating a data set for causing the CNN calculation processing unit to operate.

FIG. 5 illustrates an example of processing target image data that is stored in the RAM 608 and processed by the preprocessing unit 604 and an example of a data set that is stored in the ROM 607 and is used to cause the CNN calculation processing unit 601 to operate. The data set is used to process a network configuration illustrated in FIG. 7. Feature surfaces 903a to 903d of a first hierarchy 908 are sequentially generated using the image data as input, and then the feature surfaces 905a to 905d of a second hierarchy 909 are sequentially generated using the generated feature surfaces 903a to 903d of the first hierarchy 908 as input. Then, a feature surface 907 of a third hierarchy 910 is generated using the feature surfaces 905a to 905d of the second hierarchy 909 as input. The data set is used to perform the series of processing described above.

Data 501 is image data that is stored in the RAM 608, and data 502 to data 507 are a data set that is stored in the ROM 607. The DMAC 605 sequentially transmits the data 501 to the data 507 in this order to the CNN calculation processing unit 601. The data 501 is the processing target image data. The header of the data 501 contains an indicator DST=2, which specifies the destination, and a transfer length LENGTH=image data. More specifically, a data portion (data body) of the data 501 is transmitted to the feature surface storage unit 104 via the data distribution unit 101.

The data 502 is weight coefficients 9021a to 9021d of the first hierarchy 908, and the header of the data 502 contains an indicator DST=1, which specifies the destination, and a transfer length LENGTH=weight coefficient. More specifically, a data portion of the data 502 is transmitted to the weight coefficient storage unit 103 via the data distribution unit 101. The data portion contains the weight coefficients 9021a to 9021d. The weight coefficients 9021a to 9021d are arranged in order of use in calculation.

The data 503 is operation parameters for generating the feature surfaces 903a to 903d of the first hierarchy 908, and the header of the data 503 contains an indicator DST=0, which specifies the destination, and a transfer length LENGTH=register set. More specifically, a data portion (operation parameter) of the data 503 is transmitted to the control unit 102 via the data distribution unit 101. The operation parameter is a value that is set to the operation setting register sets to generate the feature surfaces 903a to 903d of the first hierarchy 908 illustrated in FIG. 3. The setting value of the "horizontal reference feature surface size" register is the horizontal size of the input layer 901. The setting value of the "vertical reference feature surface size" register is the vertical size of the input layer 901. The setting value of the "reference feature surface storage destination pointer" register is the head address of the memory of the feature surface storage unit 104. The operation parameters are arranged in order of processing, which is the order of the feature surfaces 903a to 903d in the present exemplary embodiment.

The data 504 and the data 505 are weight coefficients 9041a to 9041d, 9042a to 9042d, 9043a to 9043d, and 9044a to 9044d for the second hierarchy 909 and operation parameters for generating the feature surfaces 905a to 905d of the second hierarchy 909. The weight coefficients 9041a to 9041d, 9042a to 9042d, 9043a to 9043d, and 9044a to 9044d are arranged in order of use in calculation, i.e., the weight coefficients 9041a to 9044a, 9041b to 9044b, 9041c to 9044c, and 9041d to 9044d are arranged in this order. The setting values of the "horizontal reference feature surface size" and the "vertical reference feature surface size" registers contained in the operation parameters are the horizontal and vertical sizes of the feature surfaces 903a to 903d of the first hierarchy 908. Further, the setting value of the "reference feature surface storage destination pointer" register is an address of a calculation result storage destination pointer designated in the data 503.

The data 506 and the data 507 are weight coefficients 9061 to 9064 of the third hierarchy 910 and an operation parameter for generating the feature surface 907 of the third hierarchy 910. The setting value of the "final layer designation" register contained in the operation parameters is 1. The setting values of the "horizontal reference feature surface size" register and the "vertical reference feature surface size" register are the horizontal and vertical sizes of the feature surfaces 905a to 905d of the second hierarchy 909, and the setting value of the "reference feature surface storage destination pointer" register is an address of a calculation result storage destination pointer designated in the data 505. While the control unit 102 sets the values of the operation parameters of the data 503, the data 505, and the data 507 to the register sets in the present exemplary embodiment, the control unit 102 can calculate a value from the operation parameters and set the calculated value to the register sets.

As illustrated in FIG. 5, the data set for causing the CNN calculation processing unit 601 to operate includes a pair of a weight coefficient and an operation parameter (setting values of a register set to be generated) of a processing unit. The processing unit is determined based on processing target network information and the hardware configuration illustrated in FIG. 1. The hardware configuration that acts on the determination of the processing unit is specifically the memory size of the weight coefficient storage unit 103 and the memory size of the feature surface storage unit 104. The processing unit is determined so that an amount of memory of the weight coefficient that is necessary for processing per unit does not exceed the memory size of the weight coefficient storage unit 103. Furthermore, the processing unit is determined so that an amount of memory of the feature surface that is necessary for processing per unit does not exceed the memory size of the feature surface storage unit 104. In other words, the processing unit is determined so that a processing target is processible by hardware.

An amount of memory $W_l$ that is necessary for storing weight coefficients necessary for processing a hierarchy and an amount of memory $S_l$ that is necessary for storing feature surfaces are expressed as:

$$W_l = W_x(l,f,f') \times W_y(l,f,f') \times (F_l \times F_{l-1}), \text{ and}$$

$$S_l = (I_X \times I_Y) \times (F_l + F_{l-1}), \text{ where}$$

l: a generation target hierarchy number (1, 2, . . . ),
f: a generated feature surface number,
f': a reference feature surface number,
$W_x(l, f, f')$: the horizontal kernel size,
$W_y(l, f, f')$: the vertical kernel size,
$F_l$: the number of generated feature surfaces,
$F_{l-1}$: the number of reference feature surfaces, and
$I_X$, $I_Y$: the input image size (horizontal direction, vertical direction).

The amount of memory that is necessary for processing the network illustrated in FIG. 9 in hierarchical units is specified by a configuration 701 in FIG. 7. The input image size of the network in FIG. 9 is 32×32. The number of reference feature surfaces of the first hierarchy 908 is 1, and the number of generated feature surfaces of the first hierarchy 908 is 4. In a case where the kernel filter size is 3×3, the size of the weight coefficients 9021a to 9021d used in generating the four feature surfaces is 3×3×4=36 bytes when the data per element of a coefficient matrix is 1 byte. The amount of data of the feature surfaces is 32×32×5=5120 bytes.

In a case where the kernel filter size of the second hierarchy 909 is 5×5, the size of the weight coefficients 9041a to 9041d, 9042a to 9042d, 9043a to 9043d, and 9044a to 9044d used in generating four feature surfaces is similarly calculated to be 400 bytes. Further, the data amount of the feature surfaces is 8192 bytes. In a case where the kernel filter size of the third hierarchy 910 is 7×7, the size of the weight coefficients 9061 to 9064 used in generating four feature surfaces is similarly calculated to be 196 bytes, and the amount of data of the feature surfaces is 5120 bytes.

In the present exemplary embodiment, the memory size of the weight coefficient storage unit 103 is 436 bytes, and the memory size of the feature surface storage unit 104 is 16 kilobytes. The amount of memory of the weight coefficients that is necessary for processing each hierarchy is less than or equal to the memory size of the weight coefficient storage unit 103, and the amount of memory of the feature surfaces that is necessary is less than or equal to the memory size of the feature surface storage unit 104, so that a hierarchical unit is determined as the processing unit, and the data set illustrated in FIG. 5 is employed. Another example of how the processing unit is determined will be described below. In a case where the number of feature surfaces of the second hierarchy 909 of the network illustrated in FIG. 9 is eight, the memory amount that is necessary for processing in hierarchical units is as specified in a configuration 702. Specifically, the data amount of the weight coefficients of the second hierarchy 909 is 800 bytes, and the data amount of the feature surfaces is 12288 bytes. Since the data amount exceeds the memory size of the weight coefficient storage unit 103, the processing cannot be performed in hierarchical units, so that each hierarchy is processed over a plurality of times of processing. As specified in a configuration 703, the processing of the second hierarchy 909 is divided into two so that storage in the weight coefficient storage unit 103 becomes possible, and there are consequently the processing 1 to the processing 4. There are four data sets.

A case where the feature surface storage unit 104 is hardware with a memory size of 8 kilobytes and processes a network specified by the configuration 702 will be described below as another example. The data amount of the feature surfaces of the second hierarchy 909 is 12288 bytes, which exceeds the memory size of the feature surface storage unit 104. In this case, an input image is divided and processed a plurality of times. In a configuration 704, a 32-by-32 block is divided into two 32-by-16 blocks so that the processing units are storable in the feature surface storage unit 104. There are six data sets. Alternatively, there can be three data sets, and each data set can be used twice. Further, if the weight coefficients of all the hierarchies are storable, the weight coefficients do not have to be transferred in the second time. If the operation parameters of all the hierarchies are storable, the operation parameters do not have to be transferred in the second time.

Figure 8C:
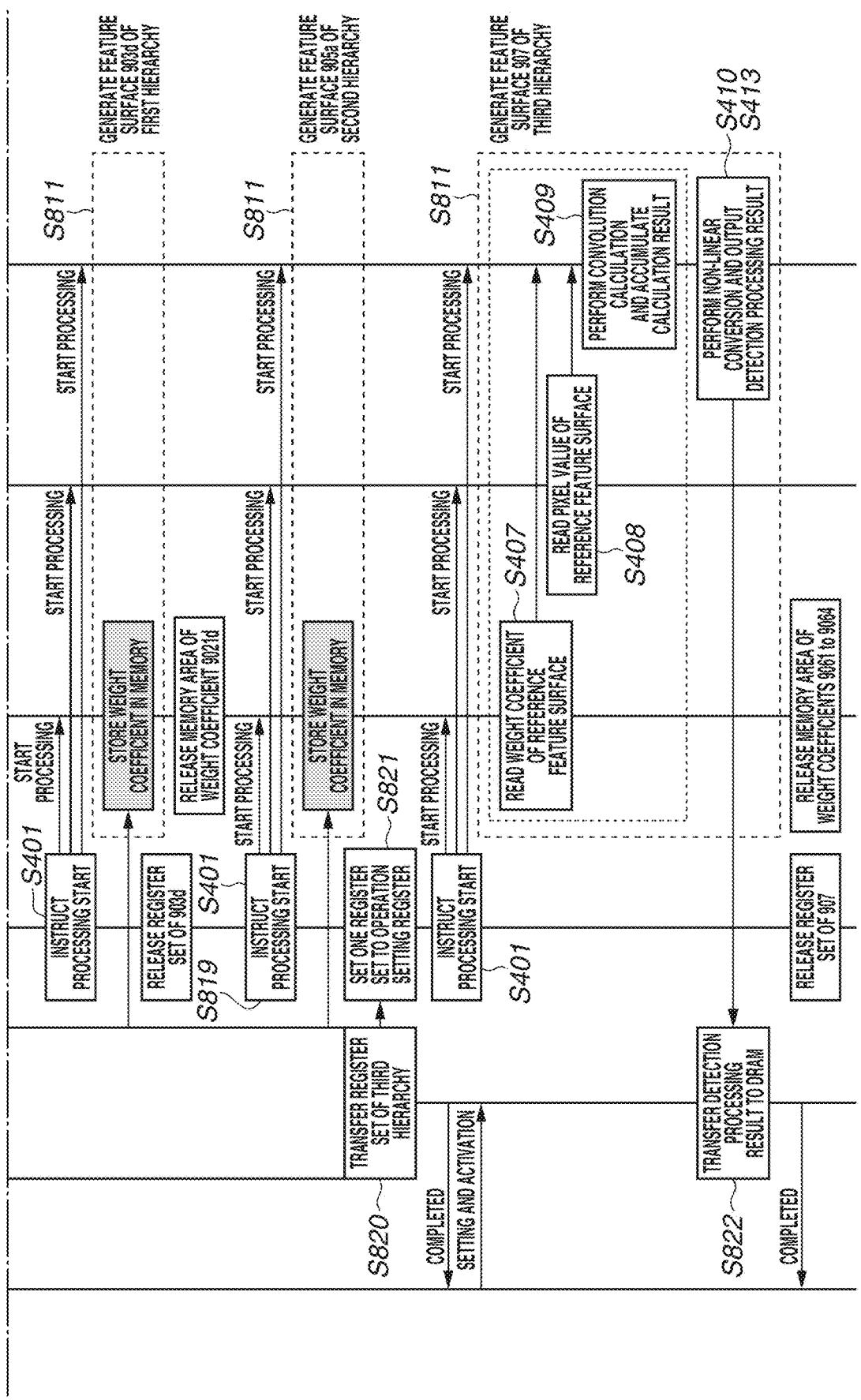

Operation performed by the image processing system illustrated in FIG. 6 to process image data of one page using the data set illustrated in FIG. 5 will be described below with reference to a sequence diagram illustrated in FIGS. 8A, 8B, and 8C. FIGS. 8A, 8B, and 8C illustrate operations performed by the CPU 606, the DMAC 605, the control unit 102, the weight coefficient storage unit 103, the feature surface storage unit 104, and the convolution calculation unit 105 and interactions therebetween in chronological order.

If the image input unit 600 receives image data, the preprocessing unit 604 processes the received image data and stores the processed image data in the RAM 608. In step S801, if the processing of the image data of one page is completed, the CPU 606 is notified of the completion of the processing. The CPU 606 instructs the CNN calculation processing unit 601 to perform initialization, and in step S802, the weight coefficient storage unit 103 and the feature surface storage unit 104 respectively update the write pointers of the weight coefficient storage unit 103 and the feature surface storage unit 104 with the head addresses of the memories. In step S803, the CPU 606 adds LENGTH and DST (=2) of the image data 501 to the previous address of the image data area of the RAM 608.

Thereafter, the head address of the image data 501 is set as a data transfer source of the DMAC 605, the CNN calculation processing unit 601 is set as a data transfer destination, and the size of the image data 501 is set as a transfer length, and if the DMAC 605 is activated, then in step S804, the DMAC 605 transfers the image data 501 from the RAM 608 to the CNN calculation processing unit 601. In step S805, since the DST of the header is 2, the data distribution unit 101, which is not illustrated in FIGS. 8A, 8B, and 8C, transfers the image data 501 to the feature surface storage unit 104, and the feature surface storage unit 104 stores the image data 501 from the head address of the memory that is specified by the write pointer. After the transfer of all the data is completed, the DMAC 605 notifies the CPU 606 of the completion of the transfer.

If the CPU 606 receives the notification of the completion of the transfer, the CPU 606 sets the head address of the data 502 as the data transfer source of the DMAC 605, the CNN calculation processing unit 601 as the transfer destination, and the total size of the data 502 to the data 507 as the transfer length. Then, in step S806, if activated, the DMAC 605 transfers the data 502 from the ROM 607 to the CNN calculation processing unit 601. Since the DST of the header is 1, the data distribution unit 101 transfers the data 502 to the weight coefficient storage unit 103. In step S807, if the memory has a free space, the weight coefficient storage unit 103 receives the data 502 and stores the weight coefficients from the head address of the memory that is specified by the write pointer of the memory. In step S808, after the transfer of the data 502 is completed, the DMAC 605 transfers the data 503. In step S809, since the DST of the header is 0, the data distribution unit 101 transmits the data 503 to the control unit 102, and the control unit 102 sets the four register sets of the feature surface 903a to 903d of the first hierarchy 908 to the operation setting register.

Since a value is set to one or more operation setting register sets, the process of generating a feature surface is started according to the flowchart illustrated in FIG. 4. First, the register set for generating the feature surface 903a of the first hierarchy 908 is processed. In step S401, the control unit 102 issues a processing start instruction to the weight coefficient storage unit 103, the feature surface storage unit 104, and the convolution calculation unit 105. The weight coefficient storage unit 103, the feature surface storage unit 104, and the convolution calculation unit 105 refer to each register value of the register set for the feature surface 903a. In this way, in step S810, steps S407 to S409 are repeatedly executed the number of times that is equal to the "horizontal filter kernel size"×"vertical filter kernel size"×"number of reference feature surfaces".

In step S811, each register value of the register set of the feature surface 903a is referred to, and steps S810, S410, and S414 are repeatedly executed the number of times that is equal to the "horizontal reference feature surface size"×"vertical reference feature surface size", and the generation of the feature surface 903a of the first hierarchy 908 is completed. At the time of the completion, the memory area storing the processed weight coefficient and the register set are released. In step S812, after the transfer of the data 503 is completed, the DMAC 605 transfers the data 504 in parallel with the process of generating the feature surface 903a of the first hierarchy 908 in step S811.

Since the DST of the header is 1, the data distribution unit 101 transmits the data 504 to the weight coefficient storage unit 103. The weight coefficient storage unit 103 stores the data 502 containing the weight coefficients 9021a to 9021d of the first hierarchy 908, and the memory still has a free area, so that in step S813, the weight coefficient storage unit 103 receives the data 504 and stores the data 504 in the memory. In step S814, after the transfer of the data 504 is completed, the DMAC 605 transfers the data 505. Since the DST of the header is 0, the data distribution unit 101 transmits the data 505 to the control unit 102. In step S815, the four register sets of the first hierarchy 908 are set, and there is still a free area for the register sets, so that the control unit 102 receives the data 505 and sets the four register sets of the feature surfaces 905a to 905d of the second hierarchy 909 to the operation setting register.

In step S816, after the transfer of the data 505 is completed, the DMAC 605 transfers the data 506. Since the DST of the header is 1, the data distribution unit 101 transmits the data 506 to the weight coefficient storage unit 103. The weight coefficient storage unit 103 stores the data 502 containing the weight coefficients 9021a to 9021d of the first hierarchy 908 and the data 504 containing the weight coefficients 9041a to 9041d, 9042a to 9042d, 9043a to 9043d, and 9044a to 9044d of the second hierarchy 909, and the memory has no free area, so that in step S817, a two-line handshake signal is controlled, and the data 506 is not received. In step S818, after the generation of the feature surface 903a of the first hierarchy 908 is completed and the memory area storing the processed weight coefficient 9021a is released, the data 506 is stored in the weight coefficient storage unit 103.

After the generation of the feature surface 903a of the first hierarchy 908 is completed, the register set of the feature surface 903a is released. Four register sets are set in step S809, and the register sets of the feature surface 903b to 903d are similarly processed. By the time the generation of the feature surface 903d, which is the last feature surface of the first hierarchy 908, is completed, the weight coefficients 9041a to 9041d, 9042a to 9042d, 9043a to 9043d, and 9044a to 9044d of the second hierarchy 909 are already stored in step S813. Furthermore, the operation setting registers of the second hierarchy 909 are already stored in step S815. Thus, in step S819, the control unit 102 immediately issues a processing start instruction to start generating the feature surface 905a of the second hierarchy 909.

In step S820, after the transfer of the data 506 is completed, the DMAC 605 transfers the data 507. Since the DST of the header is 0, the data distribution unit 101 transmits the data 507 to the control unit 102. At this time, the four register sets of the first hierarchy 908 of the control unit 102 are released whereas the four register sets of the second hierarchy 909 are set. In step S821, since there is a free space for the register set, the control unit 102 receives the data 507 and sets one register set of the feature surface 907 of the third hierarchy 910 to the operation setting register. After the transfer of all the data 502 to the data 507 is completed, the DMAC 605 notifies the CPU 606 of the completion of the transfer. If the CPU 606 receives the notification of the completion of the transfer, the CPU 606 sets the CNN calculation processing unit 601 as the data transfer source of the DMAC 605, the RAM 608 as the transfer destination, and the size of a detection processing result as the transfer length and activates the DMAC 605.

Meanwhile, the CNN calculation processing unit 601 continues to generate a feature surface, and in the generation of the feature surface 907 of the third hierarchy 910, since the value of the "final layer designation" register is 1, the convolution calculation unit 105 externally outputs the detection processing result. In step S822, the DMAC 605 transfers the output detection processing result to the RAM 608.

As described above, with the processing apparatus according to the present exemplary embodiment, by the time the generation of the feature surface(s) of a hierarchy is completed, the weight coefficients necessary for processing the next hierarchy are already stored in the weight coefficient storage unit 103 and, furthermore, at least one register set of the next hierarchy is set to the operation setting register. This reduces the time needed for data preparation at the time of switching the hierarchy, and calculation processing can be started immediately, so that the processing performance of the pattern recognition apparatus is increased.

In a case where a processing target neural network is to be changed, a processing unit that is executable by a hardware processing apparatus is determined as in the configurations 703 and 704, and operation is performed using the corresponding data set.

At this time, the control procedure is no different from that illustrated in FIGS. 8A, 8B, and 8C, except that the transfer length of the data set that is set to the DMAC 605 by the CPU 606 is different.

When the processing target neural network is to be changed, the processing apparatus according to the present exemplary embodiment operates based on a data set divided into processing units that are executable by the hardware processing apparatus. This makes it possible to change the neural network without changing the processing control of a control processor for the neural network.

While the CNN calculation processing is described as feature extraction processing in the above-described exemplary embodiment, the present invention is not limited to that described above and is also applicable to various other types of hierarchical processing such as perceptron.

While the configuration in which the convolution calculation is executed by hardware is described in the above-described exemplary embodiment, the present invention is not limited to that described above. The present invention is also applicable to a configuration in which the processing is entirely executed by software using an all-purpose processor.

According to the above-described exemplary embodiment, while CNN processing is performed on one layer, the weight coefficients and the operation parameters that are necessary for CNN processing of a next hierarchy are transferred, so that the time for data transfer at the time of switching the layer is reduced and the processing performance of hierarchical calculation processing is increased.

Furthermore, when the processing target neural network is to be changed, a data set of an operation parameter and a weight coefficient divided into processing units is generated, and the generated data set is read and executed so that the neural network can be changed without changing the processing control of the control processor for the neural network.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-036705, filed Feb. 28, 2019, which is hereby incorporated by reference herein in its entirety.

What is claimed is:

1. A data processing apparatus configured to execute hierarchical calculation processing corresponding to a neural network on input data, the data processing apparatus comprising:
   one or more processors; and
   one or more memories coupled to the one or more processors, the one or more memories having stored thereon instructions which, when executed by the one or more processors, cause the apparatus to:
   transfer a plurality of sets of control data from a control data memory, wherein each set of the plurality of sets of control data contains a weight coefficient used for an operation in corresponding one of a plurality of processing units included in specific hierarchical calculation processing of the neural network and an operation parameter which prescribes the operation, the plurality of sets of control data are transferred set by set in accordance with a processing order of the plurality of processing units in the specific hierarchical calculation processing, and the weight coefficient and the operation parameter are transferred to a coefficient memory and a register, respectively; and
   execute the specific hierarchical calculation processing by performing, for each one set of the transferred sets of control data, corresponding one processing unit of the plurality of processing units, wherein in the corresponding one processing unit, an operation prescribed by the operation parameter contained in the one set of the transferred sets of control data is performed using the weight coefficient contained in the one set of the transferred sets of control data.

2. The data processing apparatus according to claim 1, wherein while processing of one processing unit is performed, one set of control data that is for use in processing of the next processing unit.

3. The data processing apparatus according to claim 1, wherein the processing unit is a hierarchical unit of the neural network.

4. The data processing apparatus according to claim 1, wherein the processing unit is a feature surface unit of the neural network.

5. The data processing apparatus according to claim 1, wherein the processing unit is determined so that an amount of memory for the weight coefficient necessary for processing of the processing unit does not exceed a memory size of the coefficient memory.

6. The data processing apparatus according to claim 1, wherein the weight coefficient for use in processing of one processing unit is transferred to the coefficient memory in parallel with execution of processing of the previous processing unit.

7. The data processing apparatus according to claim 1, wherein in the processing unit convolution calculation is performed on the input data using the weight coefficient.

8. The data processing apparatus according to claim 1, wherein the operation parameter that is for use in processing of the next processing unit is tansfered to the register in parallel with execution of processing of the current processing unit.

9. The data processing apparatus according to claim 1, wherein the operation parameter contains a number of feature surfaces to be referenced in processing of the processing unit.

10. The data processing apparatus according to claim 1, wherein the operation parameter contains a position and a size of a feature surface to be referenced in processing of the processing unit.

11. The data processing apparatus according to claim 1, wherein the operation parameter contains a size of a kernel for use in processing of the processing unit.

12. The data processing apparatus according to claim 1,
wherein the operation parameter specifies whether processing of the processing unit is processing of a final layer in the neural network, and
wherein, in a case where the operation parameter specifies that the processing is the processing of the final layer a result of, the processing is externally output.

13. The data processing apparatus according to claim 1, wherein the processing unit is determined so that an amount of memory for storing a feature surface necessary for the processing of the processing unit does not exceed a memory size of a feature surface storage area in a memory which is referred in the processing of the processing unit.

14. The data processing apparatus according to claim 1, wherein the a plurality of sets of control data are transferred in sequence.

15. The data processing apparatus according to claim 1, wherein control data is transferred based on a destination and a transfer length that are contained in a header of the control data.

16. The data processing apparatus according to claim 1, wherein the plurality of sets of control data are transferred by a direct memory access controller, wherein each set of the plurality of sets of control data contains a weight coefficient used for an operation in corresponding one of a plurality of processing units included in the specific hierarchical calculation processing of the neural network and an operation parameter which prescribes the operation from a control data memory.

17. A data processing method of executing hierarchical calculation processing of a neural network on input data, the method comprising:

transferring a plurality of sets of control data from a control data memory, wherein each set of the plurality of sets of control data contains a weight coefficient used for an operation in corresponding one of a plurality of processing units included in specific hierarchical calculation processing of the neural network and an operation parameter which prescribes the operation, the plurality of sets of control data are transferred set by set in accordance with a processing order of the plurality of processing units in specific hierarchical calculation processing, and the weight coefficient and the operation parameter are transferred to a coefficient memory and a register, respectively; and executing the specific hierarchical calculation processing by performing, for each one set of the transferred sets of control data, corresponding one processing unit of the plurality of processing units, wherein in the corresponding one processing unit, an operation prescribed by the operation parameter contained in the one set of the transferred set of control data is performed using the weight coefficient contained in the one set of the transferred sets of control data.

* * * * *